United States Patent [19]

Loomis

[11] 4,362,418
[45] Dec. 7, 1982

[54] FERRULE JOINT

[76] Inventor: Gary A. Loomis, P.O. Box 907, Woodland, Wash. 98674

[21] Appl. No.: 218,717

[22] Filed: Dec. 22, 1980

[51] Int. Cl.³ .......................... B25G 3/00; F16B 7/02; F16D 1/00
[52] U.S. Cl. ............................... 403/334; 43/18 GF; 403/293; 403/393
[58] Field of Search ............... 403/334, 333, 393, 293; 43/18 GF

[56] References Cited

U.S. PATENT DOCUMENTS

| 3,186,122 | 6/1965 | Clock et al. | 43/18 GF |
| 3,519,294 | 7/1970 | Barnes | 43/18 GF X |
| 3,613,287 | 10/1971 | Grein | 403/334 |
| 4,070,127 | 1/1978 | Loomis | 403/334 |
| 4,083,140 | 4/1978 | Auken et al. | 43/18 GF |

FOREIGN PATENT DOCUMENTS

| 1409245 | 7/1965 | France | 43/18 GF |
| 1082664 | 9/1967 | United Kingdom | 43/18 GF |

Primary Examiner—Wayne L. Shedd
Attorney, Agent, or Firm—Graybeal & Uhlir

[57] ABSTRACT

A ferrule joint for a fishing rod blank made from joining plural flexible tapered resin shafts having hollow cores disclosed. The ferrule joint comprises a ferrule integral with one end of a first shaft. The ferrule has a tapered bore extending inwardly from the end of the first shaft. The hollow core end of a second shaft is insertable into the bore to frictionally interlock the shafts together. A transition section integral with the first shaft has a tapered bore joining the tapered bore in the ferrule to the hollow core of the first shaft. The tapered bore in the ferrule and the tapered bore in the transition sections are formed from plural overlapping patterns of fiber reinforced resins superimposed on the first shaft around the hollow core.

13 Claims, 3 Drawing Figures

FERRULE JOINT

DESCRIPTION

1. Technical Field

The present invention relates in general to fishing rods, and more particularly, to a ferrule joint for interconnecting sectioned fishing rod blanks made from fiber reinforced resin.

2. Background Art

Fishing rod blanks made from fiber reinforced resin are old in the art. Typically, these rods are fabricated in sections by wrapping fiber reinforced resin fabrics about tapered, elongate steel mandrels. The wrapped mandrel is subsequently heated at an elevated temperature, typically 250° C., to cure the resin. The steel mandrel is subsequently withdrawn, providing a flexible tapered fiber reinforced resin shaft or rod blank having a hollow core. Successive rod blanks are interconnected by a ferrule joint or the like to provide a fishing rod which can be shortened for storage, or convenience during transportation. Substantial emphasis is placed on the ferrule joint since the joining of consecutive rod blanks can cause a dead spot in the flex pattern of the assembled rod, markedly effecting the overall performance of the rod. In the past, metallic ferrules have been used to join rod blanks, but they rapidly are being replaced by nonmetallic ferrules of various designs.

One type of nonmetallic ferrule employs a tubular insert that is secured to the inner surface of the tip end of the butt section end of a rod blank and extends axially outwardly providing a tapered tubular rod blank and extends axially outwardly providing a tapered tubular sleeve over which the end of another rod blank may be telescopically engaged to frictionally interlock adjacent rod sections. Such a ferrule, known as a "spicket-type" ferrule has a slight gap between adjoining rod blanks to ensure extra travel between the butt end of one rod blank and the tip end of the adjacent rod blank. The "spicket-type" ferrule joint inherently alters the flex pattern of the fishing rod due to the fact that the insert extends within the hollow core of both rod blanks.

Another type of ferrule joint utilizes a sleeve member which surrounds the tip portion of one rod blank and is glued to the rod blank. The sleeve member extends outwardly beyond the end of the rod blank so that the tip end of the butt blank can be inserted into the sleeve member to form the fishing rod. This ferrule joint, known as the "glued on sleeve", is undesirable since it inherently produces a "dead spot" in the flex characteristic of the fishing rod.

Still another type of ferrule utilizes the end of one rod blank as the ferrule joint with the end of another rod blank telescopically insertable into the rod blank ferrule joint to frictionally interlock the rod blanks together. Such a ferrule joint typically is manufactured by the Fenwick Company. This type of ferrule joint inherently alters the flex characteristics of the fishing rod. This is primarily due to the fact that for one rod blank to telescopically fit within another rod blank, the diameter of the butt portion of one rod blank (referred to as the tip section) must be large enough to accommodate the diameter of the tip portion of the other rod blank (referred to as the butt section). To manufacture such a tip section, the taper of the tip section must be steep so that the diameter of the butt portion of the tip section is large enough to accommodate the tip portion of the butt section. However, as the outside diameter of the tip rod blank increases, the wall thickness of the rod blank must decrease so that the rod blank maintains an optimal flex pattern, otherwise a "dead spot" results. When the wall thickness becomes too thin, the rod blank can easily break when flexed.

Another type of ferrule joint is shown by applicant's prior U.S. Pat. No. 4,070,127. That ferrule joint is formed in the end of one rod blank with the end of another rod blank appropriately formed, then machined for telescopic insertion into the ferrule to frictionally interlock the two rod blanks together. The ferrule disclosed in that patent requires machining or grinding of the rod blanks to form a ferrule having the desired taper.

It has been recognized that the optimum ferrule joint would be one which is molded or integral with the rod blank and one which utilizes no glued on sleeve or "spicket-type" structure. Additionally, the ideal ferrule joint would require no machining so as to be easily and economically manufactured. Finally, the optimum ferrule joint would have a fairly rapid transition around the interconnection of successive rod blanks to ensure an optimum flex pattern for the finished fishing rod. Such an ideal ferrule joint has not been produced in the past, partially due to the fact that the fiber reinforced resin fabrics used to make the hollow rod blanks could not be wound on a steel mandrel having rapid tapers because the resin fabrics had a tendency to twist or slip on the mandrel. The present invention overcomes this problem of the prior art by providing a ferrule joint integral with the end of one rod blank and formed from a plurality of uniquely shaped and precut resin fabric patterns. As a result, the ferrule joint can be formed on steel mandrels having steep tapers so as to produce a fishing rod having optimum flex characteristics.

SUMMARY OF THE INVENTION

According to one aspect of the present invention, a ferrule joint for a fishing rod made from joining plural flexible tapered resin shafts having hollow cores comprises a ferrule integral with the end of a first shaft. The ferrule has a tapered bore extending inwardly from the end of the first shaft with the hollow core end of a second shaft being insertable into the tapered bore to frictionally interlock the shafts together. A transition section integral with the first shaft has a tapered bore therein joining the tapered bore in the ferrule to the hollow core of the first shaft. The tapered bore in the ferrule and the tapered bore in the transition section are formed from plural overlapped patterns of fiber reinforced resin superimposed on the first shaft around its hollow core.

It is an object of the present invention to provide a ferrule joint integrally molded to one end of a fishing rod blank.

A still further object of the present invention is to provide a ferrule joint having no glued sleeve or spicket-type structure associated therewith.

Another object of the present invention is to provide a ferrule joint having a transition region occurring within six inches of the end of the rod blank in which it is formed.

A still further object of the present invention is to provide a ferrule joint requiring no machining or grinding in its construction.

A still further object of the present invention is to provide a method of forming a fishing rod blank from overlapping patterns of fiber reinforced resin disposed around a mandrel having a steep taper.

The foregoing, and other objects, features and advantages of the present invention will become more apparent in light of the detailed description of the preferred embodiments thereof set forth hereafter, and illustrated in the accompanying drawings.

BEST MODE OF CARRYING OUT THE INVENTION

Figure 1:
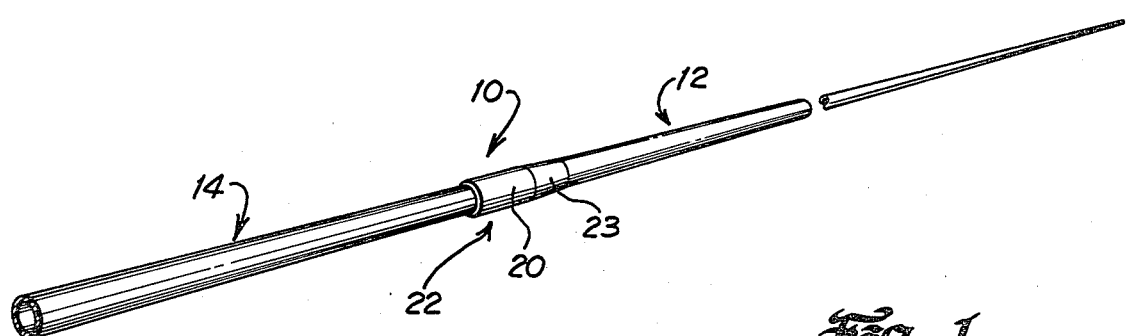
FIG. 1 is a perspective view showing fishing rod blanks interconnected by a typical ferrule joint according to the present invention.

With reference to FIG. 1, a typical ferrule joint according to the present invention is shown at 10 and joins or interconnects plural flexible tapered resin shafts or rod blanks 12, 14 having hollow cores to form a fishing rod blank. In the embodiment shown, the ferrule joint is integral with the butt portion of rod blank 12 which will be referred to as the tip section of the fishing rod blank. The tip portion of rod blank 14, referred to as the butt section, is insertable within the ferrule joint to form the fishing rod blank.

Figure 2:
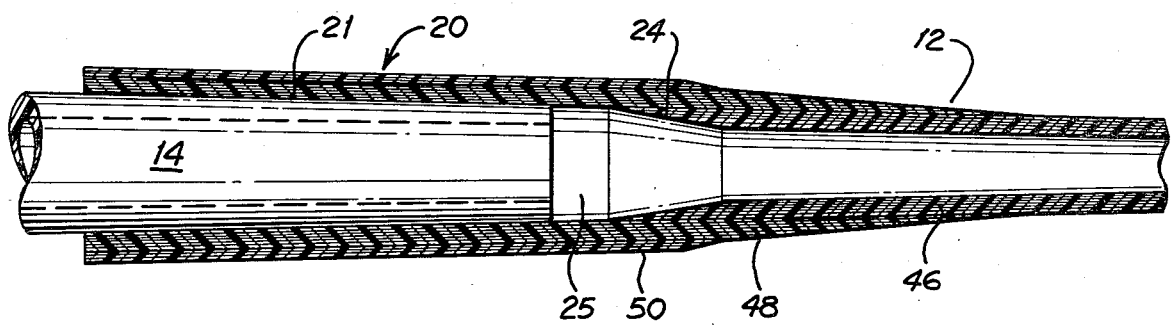
FIG. 2 is an enlarged sectional view showing a typical ferrule joint according to the present invention.

With reference to FIG. 2, the ferrule joint of the present invention generally comprises a ferrule 20 having a tapered bore 21 extending inwardly from the end of the butt portion 22 of the tip section 12 of the fishing rod blank.

The hollow core end of the tip portion of the butt section 14 is insertable into the tapered bore to frictionally interlock the tip and butt sections together. Disposed adjacent the ferrule and in axial alignment therewith is a transition section 23 integral with the tip section of the fishing rod blank. The transition section similarly has a tapered bore 24 therein which joins the tapered bore in the ferrule to the hollow core of the tip section 12. In the preferred embodiment, the length of the ferrule joint 10 is typically two and one-half inches with the length of the transition section being from between zero to six inches, but typically three-fourths of an inch. With respect to the length of the ferrule joint, a blank section 25 of a length of substantially one-half inch extends forwardly of the butt portion of the butt section 14 to allow for the butt section to be frictionally interlocked with the tip section 12 when the respective sections wear with respect to each other. With reference to FIG. 2, the ferrule joint of the present invention has an outside diameter which progressively decreases from the butt of the tip section toward the tip of the tip section. In the preferred embodiment, the inside diameter of the tapered bore at its widest point substantially approximates the outside diameter of the tip of the butt section.

Figure 3:
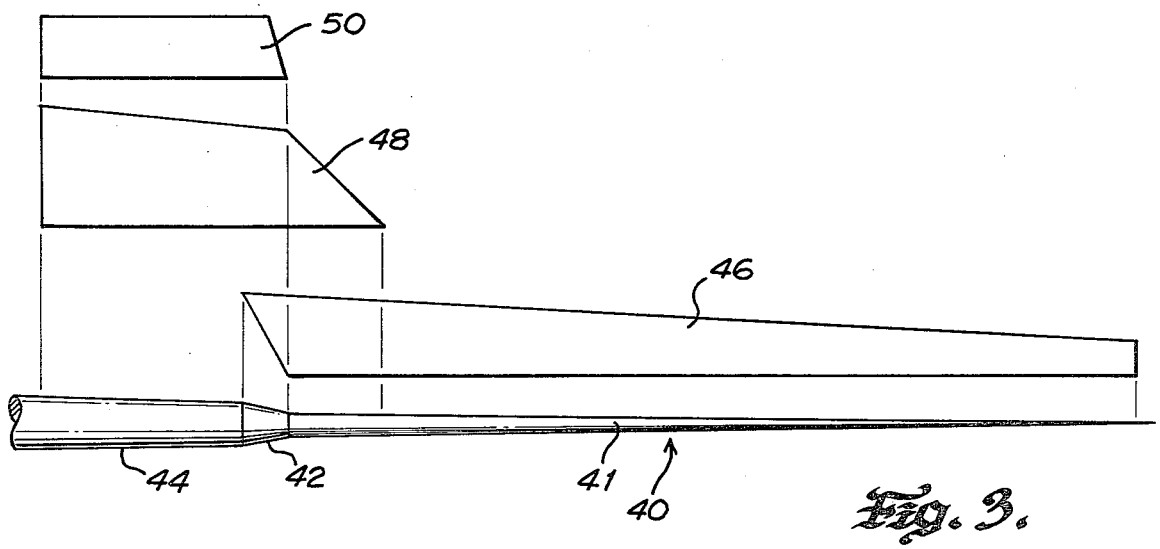
FIG. 3 is an exploded elevational view showing the typical arrangement of the plural fiber reinforced resin patterns forming the ferrule joint of the present invention.

The constructional details of the ferrule joint according to the present invention will next be described. Flexible tapered resin rod blanks having hollow cores are typically fabricated using elongated steel mandrels. A typical construction of a butt section 14 involves wrapping a steel mandrel with fiber reinforced fabrics, such as graphite tape or the like. The wrapped combination is subsequently heated at elevated temperatures, typically 250° C., to cure the resin. When the resin has been cured, the steel mandrel is removed thereby forming a hollow core tubular butt section. The tip of the butt rod section is then insertable into the ferrule to interlock the butt of the tip section to the tip of the butt section. With reference to FIG. 3, the tip section having the ferrule integral therewith similarly is made from a steel mandrel 40 having dual tapers 42, 44 at one end thereon and a tapered shaft 41. The dual tapered sections as will be described are used to form the transition area as well as the tapered bore within the ferrule. A first pattern 46 is cut from fiber reinforced fabric, such as graphite tape or the like, in a shape generally as shown in FIG. 3. The first pattern has a gentle taper extending the length of the mandrel from the tip of the mandrel to the transition section. Around the transition section, the edge of the first pattern is shaped so as to form a smooth transition from the taper 44 across the taper 42 to the tapered shaft 41. The width of the first pattern may vary according to the number of times the first pattern is to be wrapped around the tapered shaft of the mandrel. By increasing the number of wraps of the fabric around the steel mandrel, a tip section having a stiffer flex than one having fewer wraps is produced. The first pattern 46 has its fibers oriented longitudinally along the length of the steel mandrel to facilitate the flexing of the shaft.

A second pattern 48 having a shape substantially as shown in FIG. 3 is thereafter wrapped around the steel mandrel and covers the dual tapered portions 42, 44, as well as a portion of the tapered shaft 41. As shown in FIG. 2, the first and second patterns 46, 48 respectively, cooperate in such a manner that when the second pattern 48 overlays the first pattern, a smooth transitional area is provided along the length of the steel mandrel. In a similar manner, the width of the second pattern can be varied depending upon the flex characteristics desired for the rod blank. The second pattern forms the inside surface of the tapered bore in the ferrule joint. Due to the taper 44 on the steel mandrel, the tapered bore has a decreasing diameter extending from the butt of the tip section toward the tip of the tip section. The taper substantially approximates the outside diameter of the tip of the butt section as has been described. In a similar manner, the fibers in the second pattern are oriented longitudinally with respect to the length of the ferrule.

A third pattern 50 having a shape substantially as shown in FIG. 3 is wrapped around the steel mandrel over a portion of the second pattern and the dual tapers 42, 44 disposed on the steel mandrel. The third pattern has its fibers oriented transversely with respect to the fibers of the innermost patterns. In this manner, the third pattern provides hoop strength to the ferrule joint.

Thus, it can be seen that the ferrule joint of the present invention cannot be simply rolled or formed on the steel mandrel from a single cut pattern of fiber when the transition section of the ferrule joint has a steep taper. This is because in a multiple tapered ferrule joint, the steep tapers travel at a faster rate per revolution of the steel mandrel than the less steep tapers when the mandrel is rolled across the pattern. If a single pattern were used, the pattern twists on the mandrel, twisting the graphite fibers so that they are not aligned with the longitudinal axis of the rod blank, thereby substantially weakening the ferrule joint.

I claim:

1. A ferrule joint for a fishing rod blank made from joining plural flexible tapered resin shafts having hollow cores, said ferrule joint comprising a ferrule integral with the end of a first shaft and having a tapered bore extending inwardly from the end of the first shaft, with the hollow core of a second shaft being insertable into the tapered bore to frictionally interlock the shafts; a transition section integral with the first shaft having a tapered bore therein joining the tapered bore in the ferrule to the hollow core of the first shaft with the tapered bore in the ferrule and the tapered bore in the transition section being formed from plural overlapping patterns of fiber reinforced resin superimposed on the first shaft around the hollow core.

2. The ferrule joint of claim 1 wherein the outermost pattern extends longitudinally along a portion of the length of the first shaft and overlays the ferrule and transition section and has its fibers transversely oriented with respect to the fibers of the innermost patterns.

3. The ferrule of claim 1 wherein one pattern forms the flexible tapered hollow core shaft and the interior surface of the taper in the bore of the transition section, with another pattern forming the interior surface of the tapered bore in the ferrule and overlaying a portion of the first pattern.

4. The ferrule joint of claim 1 wherein the transition section is within six inches from the end of the shaft having the ferrule integral thereto.

5. The ferrule of claim 1 wherein the longitudinal length along the shaft of the transition section is substantially three-quarters of an inch.

6. The ferrule joint of claim 1 wherein the outside diameter of the ferrule joint progressively decreases in a direction toward the end of the shaft with the wall thickness around the transition section having sufficient transversal thickness to withstand the forces applied thereto while permitting the fishing rod blank to flex when the plural tapered shafts are interlocked.

7. A ferrule joint for a fishing rod blank made from joining plural, flexible, tapered, resin shafts having hollow cores, said ferrule joint comprising:

a ferrule integral with the end of a first shaft and having a tapered bore tapering inwardly from the end of the first shaft, with the hollow core of a second shaft being insertable into the tapered bore to frictionally interlock the shafts;

transition means integral with the first shaft for joining the tapered bore in the ferrule to the hollow core of the first shaft; and wherein the tapered bore in the ferrule beam formed from overlapping patterns of fiber reinforced resin superimposed on said transition means and on the first shaft around the hollow core.

8. The ferrule joint according to claim 7, wherein the length of said transition means from being zero to three inches in length.

9. The ferrule joint according to claim 8, wherein:

the diameter of the tapered bore at the intersection of the ferrule joint and the transition means of the first shaft is larger than the diameter of the hollow core of the first shaft; and the transition means comprises an annular shoulder of substantially zero length interconnecting the tapered bore of the ferrule joint with the hollow core of the first shaft.

10. The ferrule joint according to claim 8, wherein the transition section comprises a longitudinal, tapered bore joining the tapered bore of the ferrule to the hollow core of the first shaft.

11. The ferrule joint of claim 10, wherein:

one pattern forms the flexible, tapered, hollow core shaft and the interior surface of the taper in the bore of the transition section; and another pattern forms the exterior surface of the tapered bore in the ferrule and overlays a portion of the first pattern.

12. The ferrule joint according to claim 7, wherein the outermost pattern extends longitudinally along a portion of the length of the first shaft and overlays the ferrule and the transistion means.

13. The ferrule joint according to claim 12, wherein the fibers of the outermost pattern are transversely oriented with respect to the fibers of the innermost patterns.

* * * * *